United States Patent [19]
Gray

[11] 3,748,590
[45] July 24, 1973

[54] SINE COSINE FREQUENCY TRACKER

[75] Inventor: John W. Gray, Guilford, Conn.

[73] Assignee: The Singer Company, Little Falls, N.J.

[22] Filed: Apr. 14, 1972

[21] Appl. No.: 243,970

[52] U.S. Cl.................... 331/12, 329/122, 329/124, 329/125, 331/14, 331/17
[51] Int. Cl. ............................................. H03b 3/10
[58] Field of Search........................ 331/12, 17, 14; 329/122, 124, 125

[56] References Cited
UNITED STATES PATENTS

| | | | |
|---|---|---|---|
| 2,540,333 | 2/1961 | Hugenholtz | 331/12 |
| 2,731,566 | 1/1956 | Chalhoub | 331/12 |
| 3,568,067 | 3/1971 | Williford | 329/124 |
| 3,609,577 | 9/1971 | Bos | 331/17 |

Primary Examiner—John Kominski
Attorney—S. A. Giarratana, Thomas W. Kennedy et al.

[57] ABSTRACT

A frequency tracker in which the input frequency to be tracked is first heterodyned by a pair of signals, in phase quadrature, at a first reference frequency thereby producing a pair of filtered signals, in phase quadrature, proportional to the difference in frequency between the input and reference frequency. The time derivative is taken of each of these filtered signals. The outputs of each of the differentiators are multiplied together with the filtered output of the opposite channel, with the multiplied outputs combined to form a signal proportional to the input power and the difference in frequency between the input and reference frequency. The combined outputs are integrated to provide an error signal, proportional to the frequency difference, which is periodically applied to the reference frequency oscillator to adjust its frequency so that it is more closely aligned with the input frequency.

9 Claims, 6 Drawing Figures

SINE COSINE FREQUENCY TRACKER

BACKGROUND OF THE INVENTION

This invention relates to frequency trackers but in particular to a frequency tracker which must discriminate as to a predominant center frequency while monitoring an input which continually varies as to frequency content.

Conventional microwave aircraft landing systems are typically scanning beam systems wherein directional antennas sequentially illuminate small angular segments of the operational volume. The continuous scanning beam system mechanically rotates such a beam pattern in space, producing a continuous scan characteristic. Fine-step and coarse-step systems operate in a similar fashion, the major difference being that the beam is moved in quantum steps.

The angular position of the beam relative to the desired landing approach is carried on the beam in the form of a frequency modulation signal, wherein each particular modulating frequency characterizes a particular angular deviation from the desired approach. As the beam scans by the observer aircraft the average frequency is measured, and hence the beam pointing angle is ascertainable. Alternate tracker schemes utilize many variations of digital techniques which operate on the same basic principle, i.e., determining the average FM tone during the dwell time by counting the number of FM cycles between the intersections of beam rise and fall slopes with a predetermined threshold; measuring the time between these intersections with a precise digital clock; and dividing the number of cycles by clock time to obtain the average frequency. Disadvantages with these techniques include: beam pointing angle information near the beam peak is less contaminated by unwanted reflected radiations than it is in the threshold region of the pattern, however, no preferential processing in this high integrity region is provided with the digital technique; also, FM zero crossings normally do not coincide with the rise and fall thresholds, and it is both difficult and expensive to measure a fraction of an FM cycle; also, an expensive high frequency digital clock is necessary to extract the beam pointing angle information.

SUMMARY OF THE INVENTION

Briefly summarized, the present invention relates to a frequency tracker which employs analog techniques for extracting the encoded information from the received signal. The tracker accepts that portion of the received signal which contains the encoded angular position data. The tracker input is mixed in a pair of balanced modulators with the sine and cosine of the divided down output of a voltage controlled local oscillator. After processing the modulator outputs through low pass filters, a pair of signals, porportional to $\omega$, the instantaneous frequency difference between the input signal frequency and the local oscillator, is produced. These signals may be represented by $A \sin \omega t$ and $A \cos \omega t$. These signals are each fed into a differentiator which in turn feeds a multiplier wherein the differentiated output is multiplied by the filter output signal of the other channel. The output of the multiplier in the cosine channel, $-A^2\omega\cos^2\omega t$, is subtracted from the output of the multiplier in the sine channel, $A^2\omega\sin^2\omega t$. The resulting signal, $A^2\omega[\sin^2\omega t + \cos^2\omega t] = A^2\omega$, is fed into an integrator. At the end of each pass-by of the transmitted beam, the integrator output settles at a D.C. voltage which is proportional to the algebraic average of the error frequency $\omega$, weighted by $A^2$. After the pass-by the integrators output Voltage is fed to the voltage controlled oscillator to adjust its frequency to the predominant or center frequency of the just received input spectrum. This oscillator frequency, then, is indicative of the aircraft's angular position and is continually updated each time the ground transmitted beam sweeps past the aircraft. It is therefore an object of this invention to provide a closed loop frequency tracker, employing analog techniques, for tracking the center frequency of an intermittently received radiobeam and in turn providing a non-intermittent frequency output which is at all times a digital measure of said center frequency.

It is a further object of this invention to generate an error signal proportional to said center frequency by developing the relationship $A^2\omega (\sin^2\omega t + \cos^2\omega t)$ through the use of a pair of differentiators and multiplying circuits.

It is a further object of this invention to correct for the subsequent deviation from each proceeding frequency determination by integrating the error signal between the preceding frequency determination and the center frequency of the subsequently received frequency spectrum over the time period of exposure to said input and applying the net signal to a voltage controlled oscillator to thereby update said oscillator to a frequency indicative of the center frequency of the subsequently received signal.

BRIEF DESCRIPTION OF THE DRAWINGS

Reference is now made to the accompanying drawings for a better understanding of the nature of the objects of the frequency tracker. The drawings illustrate the best mode presently contemplated for carrying out the objects of the invention and its principles and are not to be construed as restrictions or limitations on its scope. In the Drawings:

Referring now to FIG. 1, oscillator 10, which may be of a type described in U.S. Pat. No. 3,389,271, is designed to operate over a frequency range which preferably is some multiple of the input frequency range. In a typical application the frequency modulated input signal appearing on input line 12 may vary from a runway center frequency of 110 KHZ to extreme beam position frequencies of 80 KHZ and 140 KHZ for a beam sweep range of ±60° about runway center. The frequency modulation of the ground beam, in a continuous scan beam configuration, would vary linearly from 80 KHZ in one extreme beam position to 140 KHZ as the beam is swept to the other extreme position. Typically, the beam width is on the order of 1° and further, the beam is caused to sweep over the controlled range perhaps five times a second. This will result in an exposure of an aircraft in the controlled range to the transmitted beam five times a second with each exposure on the order of 1.5 millisec. The received signal will be of the form depicted in FIG. 5a with the point of peak power 14, occurring at the frequency correlatable to the aircraft's position in the controlled region.

For the frequency range indicated above, the frequency range of the oscillator, 10, preferably might range from 320 KHZ to 560 KHZ or four times the input frequency range. The output 16 of the oscillator 10 is connected to a phase splitting circuit 18 and appears on output line 20 of the tracker. the signal appearing on output line 20 is a continuous frequency output, which preferably is in pulse form suitable for interface with airborne data processing equipment which is proportional to the angular position of the aircraft relative to the runway. It is updated with each sweep of the transmitted beam.

Figure 2:
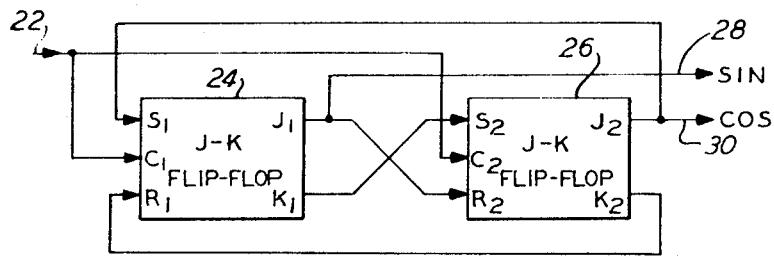
FIG. 2 is a schematic diagram of the Phase Splitter of FIG. 1.

The phase splitter, 18, frequency divides the oscillator output signal down to the range of the input signal. FIG. 2 represents but one configuration suitable to effect the phase splitting function. Input lead 22 is connected to the output of oscillator 10 and to the clock inputs $C_1$ and $C_2$ of J-K type flip flops 24 and 26, respectively. The $K_1$ output of flip flop 24 is connected to the set input, $S_2$, of flip flop 26 and the $K_2$ output of flip flop 26 is connected to the reset input $R_1$ of flip flop 24. The $J_1$ output of flip flop 24 is connected to the reset input $R_2$ of flip flop 26 and in addition provides an output signal on line 28. The $J_2$ output of flip flop 26 is connected to the set input $S_1$ of flip flop 24 and provides an output signal on line 30. The signals on lines 28 and 30 are square waves oscillating at the same frequency which, nominally, is equal to the center frequency, or frequency of peak power, of the tracker input. Because of the logic control inherent in the interconnection arrangement of FIG. 2 the signal on line 30 always leads the signal on line 28 by 90°. For ease of discussion we will refer to the signals on lines 28 and 30 as sine and cosine, respectively, to signify this 90° phase relationship.

The sine and cosine signals or modulating signals, appearing on lines 28 and 30, respectively, are then applied to balanced modulators 32 and 34 respectively. The input signal appearing on line 12 is also applied to each of the modulators 32 and 34. The balanced modulators produce output signals which are a composite of the sum of the frequencies of the input signal and modulating signal and the difference frequencies between the input signals and the modulating signals.

The signals appearing on outputs lines 36 and 38 are then applied to two identical low pass filters 40 and 42. These low pass filters have a bandwidth sufficient to pass the difference frequencies between the input and modulating signals while rejecting the sum frequencies. The outputs of the low pass filters 40 and 42 maintain the 90° phase relationship as to each other which was introduced by the modulating signals at the input to modulators 32 and 34. The outputs of filters 40 and 42 may be represented as $A \sin \omega t$ and $A \cos \omega t$ respectively, where A is proportional to the voltage level of the input signal and $\omega$ is equal to $2\pi\Delta f$, where $\Delta f$ is the difference in frequency between the input and modulating signals.

Figure 3:
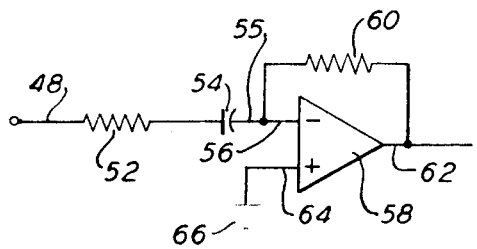
FIG. 3 is a schematic diagram of a typical differentiator in FIG. 1.

The filter outputs are then supplied to differentiators 44 and 46 along input lines 48 and 50. FIG. 3 depicts a typical differentiator which can be used as 44 and 46.

The following discussion will apply to differentiator 44 but it is to be understood that it is identically applicable to differentiator 46. The input voltage on line 48 is applied to one end of a resistor 52 the other end of which is connected to capacitor 54. The other lead 55, of capicitor 54 is connected to the inverting input, 56, of a high gain, DC operational amplifier 58. Lead 55 is also connected to one lead of feedback resistor 60. The other lead of feedback resistor 60 is connected to the output 62, of tht operational amplifier 58. The non-inverting input 64 of amplifier 58 is connected to a source of reference potential which preferably is the system ground 66.

The term, inverting input, identifies that input of an operational amplifier which, when an electrical signal is applied thereto, would result in the output signal of the amplifier being an amplified version of the input signal but reversed in phase by 180°. In accordance with well-known feedback theory, when a high gain operational amplifier such as 58 is to be used in a feedback configuration such as FIG. 3 the portion of the output voltage fed back by the feedback component such as resistor 60 must be fed back to the inverting input, such as 56, to insure circuit stability. The term, non-inverting input, identifies that input of an operational amplifier which, when an electrical signal is applied thereto, would result in the output signal of the amplifier being an amplified version of the input signal but, additionally, without a phase reversal.

The differentiator of FIG. 3 ideally is to provide the time derivative of a signal appearing on input line 48 or 50. Due to the fact that the operational amplifier 58 does not have infinite gain and because resistor 52 is needed to insure circuit stability the circuit of FIG. 3 is not an ideal differentiator. However, the imperfections introduced because of these deficiencies are negligible in their effect on system performance.

Since the output of differentiator 44 may be considered to be the time derivative of its input, which is $A \sin \omega t$, its output is $A \omega \cos \omega t$. Similarly, the output of differentiator 46, whose input is $A \cos \omega t$, is $-A \omega \sin \omega t$.

Figure 1:
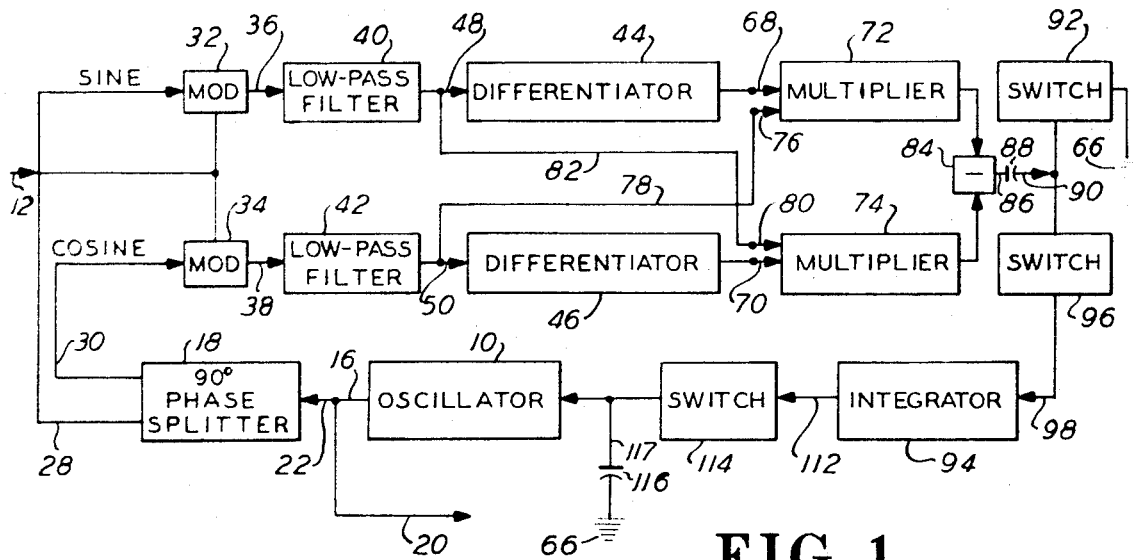
FIG. 1 is a functional block diagram of the invention.

Returning to FIG. 1, the outputs of differentiators 44 and 46, respectively, are connected to the inputs 68 and 70 of multiplying circuits 72 and 74. The other inputs to the multiplying circuits 72 and 74 are connected to the low pass filter outputs of the opposite channel, so that the input 76 of multiplier 72, in the sine channel is connected to the output of low pass filter 42 by line 78, and the second input 80 of multiplier 74 is connected to the output of low pass filter 40 through connector 82. The inputs to multiplier 72, therefore, can be represented as a cosine function appearing on the output of differentiator 44 and a cosine function appearing on the output of low pass filter 42. The inputs to multiplier 74 consist of a sine function appearing at the output of low pass filter 40 and a minus sine function appearing on the output of differentiator 46. Multipliers 72 and 74 may, preferably, be of the integrated circuit type such as MC 1595 L or MC 1594 L manufactured by the Motorola Semiconductor Co. These multipliers 72 and 74 are capable of producing the instantaneous product of the signals appearing on each of their inputs. This results in the output of multiplier 72 being of the form $A^2 \omega \cos^2 \omega t$. The output of multiplier 74 is of the form $-A^2 \omega \sin^2 \omega t$.

The output of multiplier 74 is then subtracted from the output of multiplier 72. This is represented symbolically by function block 84 but it may be effected in practice, where thP MC 1595L or MC 1594L is used for multiplier 72 and 74, by connecting together appropriate pins on the integrated circuit package. This results in a signal on line 86 equal to $A^2 \omega (\cos^2\omega t + \sin^2\omega t)$. This in turn is equal to simply $A^2\omega$, a signal proportional to the frequency difference between the input signal and the modulating signals and the power level of the input signal.

Capacitor 88 in series with the combined outputs of multiplier 72 and 74 eliminates any d.c. offset voltage and drift which may be introduced by the multipliers.

The other side of capacitor 88 is connected by line 90 either to ground 66 through switch 92, or connected to integrator 94 through switch 96, depending on which mode the frequency tracker is in. Switches 92 and 96 may be of the fast relay type or solid state switches such as field effect transistors. Switches 92 and 96 are energized alternately upon receiving command signals generated either by a timing system that it synchronized with the transmission of the ground signal or by a system which senses when the magnitude of the received microwave power exceeds a predetermined value thereby indicating the presence of the ground beam in the immediate vicinity of the aircraft. During that portion of the ground beam sweep when the aircraft is not in the signal path, switch 92 shorts capacitor 88 through line 90 to ground 66. This prevents the build-up of a d.c. charge on capacitor 88 which might affect circuit performance in the acquisition mode, i.e., the portion of the beam sweep when the aircraft is receiving the ground transmitted signal.

Figure 4:
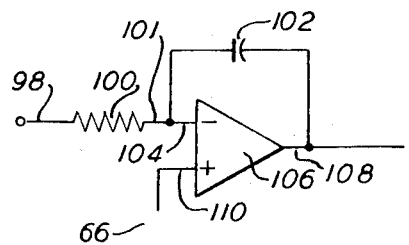
FIG. 4 is a schematic diagram of the integrator in FIG. 1.

During the acquisition mode, switch 96 is closed and switch 92 is open. The signal on line 90 is thus connected to integrator 94. FIG. 4 represents a suitable integrator for this punpose. The input lead 98 of integrator 94 is connected to an input resistor 100. The other lead, 101, of input resistor 100 is connected to a feedback or integrating capacitor 102 and the inverting input 104 of an operational amplifier 106. The other end of feedback or intergrating capacitor 102 in connected to the output 108 of operational amplifier 106. The non-inverting input 110 of operational amplifier 106 is connected to ground 66. Returning to FIG. 1, the output 108 of the integrator is connected by a lead 112 to switch 114. Switch 114, too, can be of the fast relay or field effect transistor type. It is energized synchronously with the energization of switches 92 and 96. During the acquisition mode, switch 114 is open thereby prohibiting any unwanted perturbation of oscillator 10 during the pass-by of the transmitted beam. After the pass-by, switch 114 is closed whereby the output 108 of integrator 94 is connected to one end, 117, of a hold capacitor 116 which shunts the input of oscillator 10. The other end of the hold capacitor is connected to ground 66. When switch 114 is opened, as during the acquisition mode, capacitor 116 supplies a constant input voltage to the oscillator 10 so that the output of the oscillator 10 appearing on line 20, the tracker output, will be a continuous frequency representation proportional to the center frequenty of the input spectrum received during the previous sweep, even though the loop is open during the acquisition mode.

Figure 5:
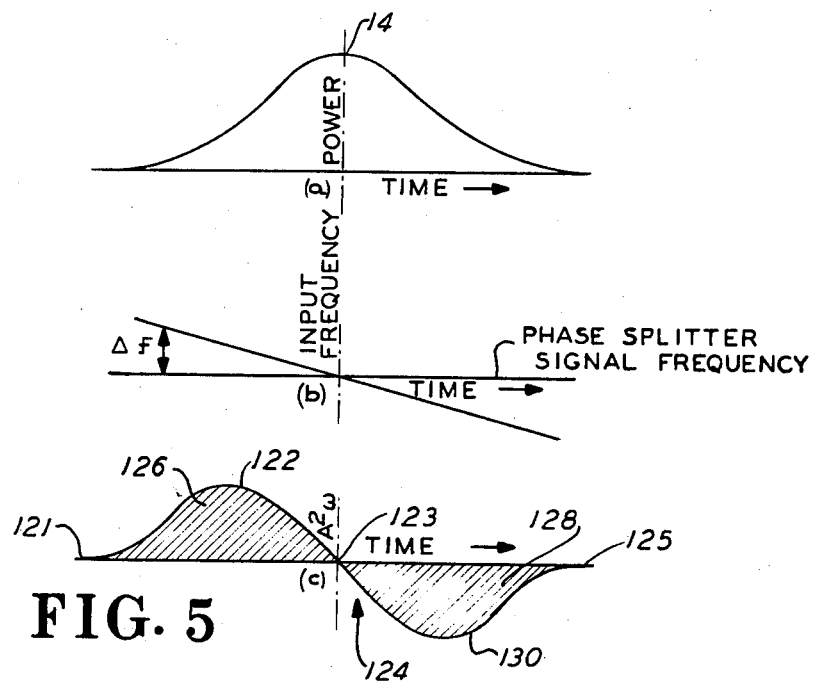
FIG. 5 is a graphical representation used to illustrate a null condition in the frequency tracker.
Figure 6:
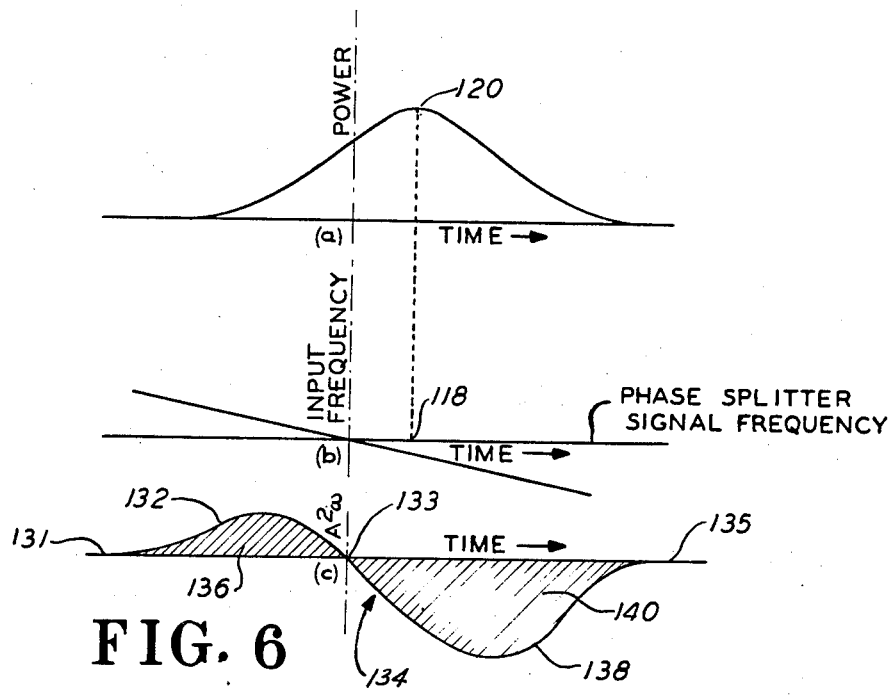
FIG. 6 is a graphical representation used to illustrate an off-null condition in the frequency tracker.

The overall operation of the frequency tracker can best be understood by first considering the operation of the tracker when the frequency of the phase splitter signal exactly equals the center frequency of the received signal and by considering that condition of operation where the frequency of the phase splitter iS just off the center frequency of the received input signal. FIG. 5 is a graphical representation of particular tracker loop characteristics during the first such condition, i.e., when the center frequency of the input corresponds to the phase splitter frequency. FIG. 6 represents the second condition wherein the phase splitter frequency is somewaht higher than the center frequency of the received input spectrum. The three curves of FIG. 5 correspond to the same three functions of FIG. 6, except for the different system conditions mentioned above. During the time interval the aircraft is exposed to the transmitted beam, for the beam width and sweep rates mentioned above the frequency modulation of the beam will vary through a range of from 1 KHZ to 2 KHZ. Thus, FIGS. 5a and 6 a represent a continuum of different frequencies occurring about a center frequency or frequency of peak power which is correlatable to the aircraft's position. FIGS. 5b and 6b represent the difference, $\Delta f$, between the frequency of the outputs of phase splitter 18 appearing on lines 28 and 30 and each of the frequencies in the received signal as the transmitted beam is swept past the aircraft. FIGS. 5a and 5b reflect the fact that the tracker loop is operating in a null condition since $\Delta f$ in FIG. 5b is zero at the instant the received signal is at maximum or peak power. FIGS. 6a and 6b reflect the fact that the tracker loop is in an off-null condition since at the instant 118, of peak power 120, $\Delta f$ is other than zero. FIGS. 5c and 6c represent the signal appearing al the output of subtractor 84 on line 86. As noted above the signal appearing on line 86 equals $A^2\omega$. Since A is proportional to the voltage level of the input signal, $A^2$ is proportional to the power level and is therefore reflected in FIG. a of FIGS. 5 and 6. Again, $\omega$ equals $2\pi\Delta f$ and therefore is reflected in FIG. b of FIGS. 5 and 6. Thus, FIG. c of FIGS. 5 and 6 is effectively the product of curves a and b of each of the respective figures. It is these voltages which are applied to integrator 94 when switch 96 is activated during the acquisition mode.

The output of integrator 94 appearing on lead 112, after the pass-by of the transmitted beam, will reflect the effect of integrating the curves in FIG. 5c or 6c depending on the relationship of the phase splitting signal frequency to the center frequency of the received spectrum. For the conditions reflected in FIG. 5a, integrator 94 will first integrate with respect to segment 122 of curve 124 lying between points 121 and 123. Thus, the output of the integrator beginning at the first voltage proportional to the center frequency of the previously received spectrum, changes in value, in a direction depenxing on system phasing, until the output of the integrator reaches a second voltage — the difference between the first and second voltages being proportional to the area 126 under segment 122 of curve 124. After $\Delta f$ passes through zero the output of the integrator reverses its direction of change and heads toward a third voltage such that the difference between the second and third voltages is proportional to the area 128 under segment 130 of curve 124, which lies between points 123 and 125. FIG. 5a is symmetrical about the point of peak power. FIG. 5b is symmetrical about the point of intersection of the input frequency with the phase splitting signal frequency with $\Delta f$ and thus $\omega$ changing sign at this intersection point. Since FIG. 6 represents a nulled condition, the point of peak power and point of intersecton of the input frequency with the phase splitting signal frequency coincide in time. Thus, segment 130 of curve 124, which represents $A^2\omega$, is identical to segment 122 and thus the areas under each of these portions of the curve are equal. Thus, the third voltage to which the integrator returns is identical with the first voltage 9ith the net change in integrator output voltage after a complete sweep equal to zero. Thus, when switch 114 is actuated after the acquisition mode holding capacitor 116 and the input of oscillator 10 see no change in the integrator output and thus the frequency of oscillator 10 and the phase splitter signal remains the same.

For the conditions reflected in FIG. 6a, where the frequency of the phase splitter circuit is initially higher than the center frequency of the input spectrum the response of the tracker loop would be as follows. Integrator 94 would first integrate with respect to segment 132 of curve 134 which lies between points 131 and 133. Again, the output of the integrator, beginning at a first voltage proportional to the center frequency of the previously received spectrum, changes in value until the output reaches a second voltage — the difference between these voltages now being proportional to the area 136 under segment 132 of curve 134. After $\Delta f$ passes through zero the integrator is integrating along the segment 138 of curve 134 defined by points 133 and 135. This results in a reversal of the direction of change of the output of the integrator. The integrator reaches a third voltage wherein the difference between the second and third voltage is proportional to the area 140 under segment 138 of curve 134. The overall net voltage change of the integrator output is proportional to the difference in areas under segments 132 and 138. In the particular case illustrated since the point of peak power 120 occurred after the point of zero crossing of $\Delta f$ the area 140 under segment 138 is greater than the area 136 so that the change from the second to the third voltage would be greater than the change from the first to the second. It is readily apparent that if the phase splitter signal frequency was originally lower than the center frequency of the received spectrum then area 136 would be larger than 140 with a resulting opposite effect in the net change of the integrator output voltage. Now when switch 114 is actuated holding capacitor 116 and the input of oscillator 10 see a net change in the output voltage of the integrator. Again, the system phasing is arranged so that the oscillator frequency and therefore the phase splitter frequency is brought closer to the center frequency of the received spectrum. Successive sweeps will further diminish the residual error. It is even possible, by the use of automatic gain circuitry (AGC) connected say between the output of filters 40 and 42 and input 12 and the proper choice of circuit parameters, to achieve total correction of a small error in a single sweep.

Although the description of the preferred embodiment centered around its application in a landing system, it is to be noted that the tracker depicted above can be employed to give more accurate results than existing trackers in airborne doppler navigation systems. This is especially true where the inputs to the tracker are intermittent such as doppler systems where the frequency tracker is time shared among two or more beams.

It can also be appreciated that changes in the above embodiment can be made without departing from the scope of the present invention, and that other variations of the specific designs disclosed above can be made by those skilled in the art without departing from the invention as defined in the appended claims.

What is claimed is:

1. An apparatus for tracking the center frequency of successive input spectrum of frequencies which comprises:

means for generating a first and second signal having an identical first frequency and bearing a 90° phase relationship one to the other; means for modulating said spectrum of frequencies by said first and second signals whereby the output of said modulating means contains the difference frequencies between said input spectrum and said first and second signals;

means for taking the time derivative of said modulating means output;

means for multiplying together the output of said modulating means with the output of said means for taking the time derivative whereby an output signal is produced proportional to the power level of said input frequencies and to the difference in frequency between said input spectrum and said first frequency;

means for integrating said multiplier output whereby an error signal is generated proportional to said center frequency, said means for integrating including, means for connecting to said multiplier output only during that period of time when the input of said tracking apparatus is exposed to said input spectrum; and means for applying said error signal to said signal generating means during that period of time when the input of said tracking apparatus is not exposed to said input spectrum whereby the first frequency of said first and second signals is corrected to a second frequency, closer than said first frequency, to the center frequency of said input spectrum.

2. The tracker of claim 1 wherein said signal generating means further comprises:

An oscillator for generating a signal having a frequency proportional to said error voltage; and means for phase splitting said oscillator signal whereby said first and second signals are generated which are proportional in frequency to said oscillator signal.

3. The tracker of claim 2 wherein said first and second signals are one-fourth the frequency of said oscillator signal.

4. The tracker of claim 2 wherein said modulating means further comprises:

a pair of balanced modulators for modulating said input spectrum by said first and second signals applied respectively thereto, whereby said balanced modulators produce a pair of outputs containing sum frequencies and said difference frequencies; and a pair of identical low pass filters for filtering the outputs of said balanced modulators such that only said difference frequencies are passed to the output thereof.

5. The tracker of claim 4 wherein said means for taking the time derivative further comprises a pair of differentiators, the outputs oF said filters being respectively applied thereto.

6. The tracker of claim 5 wherein said multiplying means further comprises:
   a pair of multipliers;
   means for applying the outputs of said differentiators to a respective first input of each of said multipliers;
   means for applying the outputs of said filters to a respective second input of each of said multipliers, said multipliers forming the product of the signals appearing at their respective inputs; and
   means for combining the output of one said multiplier with the output of the other said multiplier whereby said combined outputs are proportional to the power level of said input spectrum and to the difference in frequency between said input spectrum and said first frequency.

7. The tracker of claim 6 wherein said integrating means comprises:
   a ground reference;
   a capacitor connected to said combining means for blocking any d.c. offset inherent in said multipliers;
   an integrator for integrating said combined output signal to produce said error signal;
   a first switch, actuated during those times when said tracker is not tracking said input spectrum for connecting the output of said capacitor to said ground reference whereby residual d.c. voltages on said capacitor are removed; and
   a second switch, actuated during those times when said tracker is tracking said input spectrum, for connecting said combined output through said capacitor to the input of said integrator.

8. The tracker of claim 7 wherein said means for applying said error signal to said signal generating means comprises:
   a holding capacitor shunted across the input of said oscillator; and
   a third switch for connecting the output of said integrator to the junction of said holding capacitor and the input of said oscillator, said third switch being opened during those times when said tracker is tracking said input spectra.

9. The tracker of claim 8 wherein said first and second signals are one-fourth the frequency of said oscillator signal.

* * * * *